US011757728B2

(12) United States Patent  
Jensen et al.

(10) Patent No.: US 11,757,728 B2
(45) Date of Patent: Sep. 12, 2023

(54) AUTONOMIC METHOD FOR MANAGING A COMPUTING SYSTEM

(71) Applicant: BRITISH TELECOMMUNICATIONS PUBLIC LIMITED COMPANY, London (GB)

(72) Inventors: Kjeld Jensen, London (GB); Botond Virginas, London (GB); Stephen Cassidy, London (GB); Phil Bull, London (GB); David Rohlfing, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 576 days.

(21) Appl. No.: 15/776,918

(22) PCT Filed: Dec. 9, 2016

(86) PCT No.: PCT/EP2016/080491
§ 371 (c)(1),
(2) Date: May 17, 2018

(87) PCT Pub. No.: WO2017/102595
PCT Pub. Date: Jun. 22, 2017

(65) Prior Publication Data
US 2018/0343171 A1 Nov. 29, 2018

(30) Foreign Application Priority Data

Dec. 18, 2015 (GB) ....................... 1522390
Dec. 18, 2015 (GB) ....................... 1522392
(Continued)

(51) Int. Cl.
*H04L 41/147* (2022.01)
*H04L 41/16* (2022.01)
(Continued)

(52) U.S. Cl.
CPC .......... *H04L 41/147* (2013.01); *G06N 20/00* (2019.01); *H04L 41/0893* (2013.01);
(Continued)

(58) Field of Classification Search
CPC ....... H04L 41/147; H04L 41/16; H04L 41/06; H04L 41/142
See application file for complete search history.

(56) References Cited

U.S. PATENT DOCUMENTS 6,356,889 B1    3/2002  Lohman et al.
6,513,025 B1 *  1/2003  Rosen ................... G06N 5/025
                                                706/45
(Continued)

FOREIGN PATENT DOCUMENTS

CN    1795473    6/2006
CN  104780217    7/2015
(Continued)

OTHER PUBLICATIONS

Ivano Irrera, Marco Vieira; A Practical Approach for Generating Failure Data for Assessing and Comparing Failure Prediction Algorithms; 2014 IEEE 20th Pacific Rim International Symposium on Dependable Computing; pp. 86-95 (Year: 2014).*

(Continued)

*Primary Examiner* — Kakali Chaki
*Assistant Examiner* — Su-Ting Chuang
(74) *Attorney, Agent, or Firm* — Nixon & Vanderhye P.C.

(57) ABSTRACT

This invention provides an autonomic method for controlling an algorithm on a multi-terminal computing system, wherein the algorithm is configured to analyse diagnostic data for each terminal and an outcome of the analysis is a first action or a second action, and a device for implementing the method, the method comprising the steps of: receiving a first set of data for the multi-terminal computing system;
(Continued)

applying the algorithm to the first set of data to classify each terminal in the multi-terminal computing system as being associated with either a first action or second action; re-classifying a first subset of terminals classified as being associated with the first action as being associated with the second action; and applying the first actions, second actions, and reclassified second actions respectively to each terminal in the multi-terminal computing system.

16 Claims, 6 Drawing Sheets

(30) Foreign Application Priority Data

Dec. 18, 2015 (GB) .................................... 1522410
Nov. 29, 2016 (GB) .................................... 1620199

(51) Int. Cl.
*G06N 20/00* (2019.01)
*H04L 41/0893* (2022.01)
*H04L 41/142* (2022.01)
*H04L 41/06* (2022.01)

(52) U.S. Cl.
CPC .............. *H04L 41/16* (2013.01); *H04L 41/06* (2013.01); *H04L 41/142* (2013.01)

(56) References Cited

U.S. PATENT DOCUMENTS

| | | | |
|---|---|---|---|
| 7,292,152 | B2 | 11/2007 | Torkkola et al. |
| 7,805,388 | B2* | 9/2010 | Weston ................. C12Q 1/6883 706/20 |
| 2004/0059966 | A1 | 3/2004 | Chan et al. |
| 2004/0252027 | A1 | 12/2004 | Torkkola et al. |
| 2005/0015683 | A1 | 1/2005 | Clark et al. |
| 2005/0132052 | A1 | 6/2005 | Uttamchandani et al. |
| 2007/0036339 | A1 | 2/2007 | Cioffi et al. |
| 2007/0174292 | A1 | 7/2007 | Li et al. |
| 2008/0250265 | A1* | 10/2008 | Chang ................. G06F 11/0709 714/4.12 |
| 2009/0177697 | A1 | 7/2009 | Gao et al. |
| 2009/0327172 | A1 | 12/2009 | Liu et al. |
| 2010/0145647 | A1* | 6/2010 | Bouchard ........... G06F 11/0733 702/85 |
| 2010/0223499 | A1 | 9/2010 | Panigrahy et al. |
| 2011/0051906 | A1 | 3/2011 | Cioffi et al. |
| 2011/0185220 | A1 | 7/2011 | Foley et al. |
| 2011/0282813 | A1 | 11/2011 | Sgro et al. |
| 2014/0068330 | A1 | 6/2014 | Hecox et al. |
| 2014/0156568 | A1 | 6/2014 | Ganguly et al. |
| 2014/0304408 | A1 | 10/2014 | Rhee |
| 2015/0039540 | A1 | 2/2015 | Dong et al. |
| 2015/0106165 | A1 | 4/2015 | Rai et al. |
| 2015/0106485 | A1 | 4/2015 | Chaudhuri et al. |
| 2015/0254555 | A1 | 9/2015 | Williams, Jr. et al. |
| 2015/0379426 | A1 | 12/2015 | Steele et al. |
| 2018/0018553 | A1 | 1/2018 | Bach et al. |

FOREIGN PATENT DOCUMENTS

| | | |
|---|---|---|
| EP | 2 375 637 | 10/2011 |
| WO | 2006/129145 | 12/2006 |
| WO | 2013/154569 | 10/2013 |
| WO | 2015/165525 | 11/2015 |
| WO | 2015/185108 | 12/2015 |
| WO | 2017/102598 | 6/2017 |
| WO | 2017/102601 | 6/2017 |
| WO | 2017/102602 | 6/2017 |
| WO | 2019/076541 | 4/2019 |
| WO | 2019/076541 A1 | 4/2019 |

OTHER PUBLICATIONS

Luo, Optimization Design of Cascaded Classifiers, 2005 IEEE Computer Society Conference on Computer Vision and Pattern Recognition (CVPR'05) (Year: 2005).*
Sun, Improving Iris Recognition Accuracy via Cascaded Classifiers, IEEE Transactions on Systems, vol. 35, No. 3, Aug. 2005 (Year: 2005).*
International Search Report and Written Opinion issued in PCT/EP2016/080491 dated Mar. 8, 2017 (11 pages).
International Preliminary Report on Patentability issued in PCT/EP2016/084091 dated Mar. 12, 2018 (17 pages).
Written Opinion of the International Preliminary Examining Authority issued in PCT/EP2016/080491 dated Nov. 15, 2017 (7 pages).
Combined Search and Examination Report dated Aug. 9, 2016, issued in Application No. GB 1522390.2 (6 pages).
European Search Report dated Jun. 8, 2016 issued in Application No. EP 152 01 207 (7 pages).
Extended European Search Report dated Jun. 8, 2016 issued in Application No. EP 171 973 79 (8 pages).
Combined Search and Examination Report dated Jun. 10, 2016, issued in Application No. GB 1522392.8 (6 pages).
Extended European Search Report dated May 31, 2016 issued in Application No. EP 152 012 10 (8 pages).
Combined Search and Examination Report dated Jun. 10, 2016, issued in Application No. GB 1522410.8 (6 pages).
Extended European Search Report dated May 31, 2016 issued in Application No. EP 15 20 1213 (9 pages).
International Search Report and Written Opinion issued in PCT/EP2016/080497 dated Mar. 10, 2017 (14 pages).
International Search Report and Written Opinion issued in PCT/EP2016/080503 dated Jan. 11, 2017 (15 pages).
International Preliminary Report on Patentability issued in PCT/EP2016/080503 dated Jan. 25, 2018 (8 pages).
Written Opinion of the International Preliminary Examining Authority issued in PCT/EP2016/080503 dated Nov. 30, 2017 (9 pages).
International Search Report and Written Opinion issued in PCT/EP2016/080508 dated Feb. 8, 2017 (12 pages).
Basiri, et al., "An Application of the CORER Classifier on Customer Churn Prediction", 6th International Symposium on Telecommunications (IST'2012) 978-1-4673-2073-3/12 2012 © 2012 IEEE (6 pages).
Costa, et al., "An Intelligent Alarm Management System for Large-Scale Telecommunication Companies", L. Seabra Lopes et al. (Eds.): EPIA 2009, LNAI 5816, pp. 386-399, 2009, © Springer-Verlag Berlin Heidelberg 2009 (14 pages).
Yang, et al. "Moderated VFDT in Stream Mining Using Adaptive Tie Threshold and Incremental Pruning", Department of Science and Technology, University of Macau, A. Cuzzocrea and U. Dayal (EDs.): DaWak 2011, LNCS 6862, pp. 471-483. 2011 © Springer-Verlag Berlin Heidelberg 2011 (13 pages).
Alpaydin, "Introduction to Machine Learning", 2nd Edition, Chapters 1 and 9, MIT Press 2010 (19 pages).
Salfner, et al., "A Survey of Online Failure Prediction Methods" ACM Computing Surveys, vol. 42, No. 3, Article 10, Publication Date: Mar. 10, 2010 (42 pages).
Irrera, et al., "A Practical Approach for Generating Failure Data for Assessing and Comparing Failure Prediction Algorithms", 2014 IEEE 20th Pacific Rim International Symposium on Dependable Computing (10 pages).
Lemos, et al., "Fuzzy Multivariate Gaussian Evolving Approach for Fault Detection and Diagnosis", E. Hullermerer, R. Kruse and F. Hoffman (Eds), IPMU 2010 LNAI 6178, pp. 360-369, 2010 (10 pages), © Springer-Verlag Berlin Heidelberg 2010 (10 pages).
Moshtaghi, et al., "Evolving Fuzzy Rules for Anomaly Detection in Data Streams" IEEE Transactions on Fuzzy Systems vol. 23, No. 2, Jun. 2015 (12 pages).
Extended European Search Report dated Mar. 31, 2020, issued in EP Application No. 19206266.9 (8 pages).
English translation of Chinese Office Action dated Aug. 3, 2020, issued in CN Application No. 201680074231.4 (6 pages).

(56) References Cited

OTHER PUBLICATIONS

Combined EP Search and Examination Report, dated Apr. 22, 2020, issued in GB 1915750.2 (7 pages).
Examination Report dated Nov. 12, 2020, issued in GB 1915750.2 (3 pages).
International Search Report and Written Opinion dated Mar. 24, 2021 issued in International Application No. PCT/EP2020/075053 (14 pages).
Second Written Opinion of the International Preliminary Examining Authority dated Oct. 18, 2021 issued for PCT/EP2020/075053 (10 pages).

* cited by examiner

AUTONOMIC METHOD FOR MANAGING A COMPUTING SYSTEM

This application is the U.S. national phase of International Application No. PCT/EP2016/080491 filed Dec. 9, 2016 which designated the U.S. and claims priority to GB Patent Application No. 1522390.2 filed Dec. 18, 2015, GB Patent Application No. 1522410.8 filed Dec. 18, 2015, GB Patent Application No. 1522392.8 filed Dec. 18, 2015 and GB Patent Application No. 1620199.8 filed Nov. 29, 2016, the entire contents of each of which are hereby incorporated by reference.

FIELD OF THE INVENTION

The present invention relates to an autonomic method for managing a multi-user computing system.

BACKGROUND

Computing systems have been used widely for decades as programmable devices for performing certain processes. These processes typically involve an algorithm acting on an input (e.g. data) to produce an output (e.g. a decision). The algorithm is typically created manually by a human operative.

For each process that must be managed by a computing system, a human operative must act in a supervisory role to ensure that the algorithm is fit for purpose, such that any output is commensurate to the input and satisfying any business requirements. If the operative determines that the algorithm is not suitable for any reason, then he or she must determine what modifications are necessary and then manually make these changes. This is a time-consuming and difficult job. Accordingly, the field of autonomic computing emerged to address this.

An autonomic process is one in which the computing system manages a particular algorithm. The autonomic process may therefore make modifications to the algorithm by utilising machine learning processes, which act on operational data for the computing system and generate algorithm modifications which are optimised according to specified performance criteria.

The present invention relates to improvements in the field of autonomic methods for managing multi-user computing systems.

SUMMARY OF THE INVENTION

According to a first aspect of the invention, there is provided an autonomic method for controlling an algorithm on a multi-terminal computing system, wherein the algorithm is configured to analyse diagnostic data for each terminal and an outcome of the analysis is a first action or a second action, the method comprising the steps of: receiving a first set of data for the multi-terminal computing system; applying the algorithm to the first set of data to classify each terminal in the multi-terminal computing system as being associated with either a first action or second action; re-classifying a first subset of terminals classified as being associated with the first action as being associated with the second action; and applying the first actions, second actions, and re-classified second actions respectively to each terminal in the multi-terminal computing system.

Embodiments of the invention therefore create an enriched data set for the development of algorithms operating on computing systems in which the operational data exhibits the property that a performance criterion of a success prediction of the algorithm is not derivable for each terminal having a first action applied thereto. In these scenarios, the output of the algorithm is re-classified as a second action and applied to the terminal. The response of the terminal may then be monitored to determine how it reacts, and this new data may be subsequently used to develop the algorithm by, for example, a machine-learning process.

The step of re-classifying the first subset of terminals classified as being associated with the first action as being associated with the second action may include predicting a likelihood of success value for each terminal classified as being associated with the first action if re-classified as being associated with the second action; and selecting a first subset of terminals to re-classify as being associated with the second action based on the predicted likelihood of success values. In embodiments of the invention, the terminals which have a greater chance of success (and therefore a greater chance of causing a subsequent change to the algorithm) are re-classified. This minimises the negative impact of re-classifying cases which have a relatively small chance of success compared to, for example, a random selection of re-classifications.

The step of predicting a likelihood of success value for each terminal classified as being associated with the first action if re-classified as being associated with the second action may include identifying a first group of terminals classified as being associated with the first action that have a likelihood of success if re-classified as being associated with the second action above a predetermined accuracy threshold; identifying a second group of terminals classified as being associated with the first action that have a likelihood of success if re-classified as being associated with the second action below a predetermined accuracy threshold; and assigning a first likelihood of success value to each terminal in the first group and a second likelihood of success value to each terminal in the second group. The first subset of terminals may be selected from the first group.

The method may further comprise the step of: re-classifying a second subset of terminals classified as being associated with the first action as being associated with the second action, wherein the second subset of terminals are selected from the second group. This may generate more enriched data such that an algorithm used to identify the cases to re-classify may be developed.

The first set of data may have the property that a performance criterion of a success prediction of the algorithm is not derivable for each terminal having a first action applied thereto. Furthermore, the first set of data may have the property that a performance criterion of a success prediction of the algorithm is not derivable for each terminal having a second action applied thereto, and the method further comprises the steps of: re-classifying a third subset of terminals classified as being associated with the second action as being associated with the first action; and applying the first actions, second actions, re-classified first actions and re-classified second actions respectively to each terminal in the multi-terminal computing system.

According to a second aspect of the invention, there is provided a computer program comprising instructions which, when the program is executed by a computer, cause the computer to carry out the method the first aspect of the invention. The computer program may be stored on a computer-readable data carrier.

According to a third aspect of the invention, there is provided a computing apparatus comprising an input/output interface for receiving diagnostic data relating to a multi-user computing system, and a processor configured to carry out the method of the first aspect of the invention.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

Figure 1:
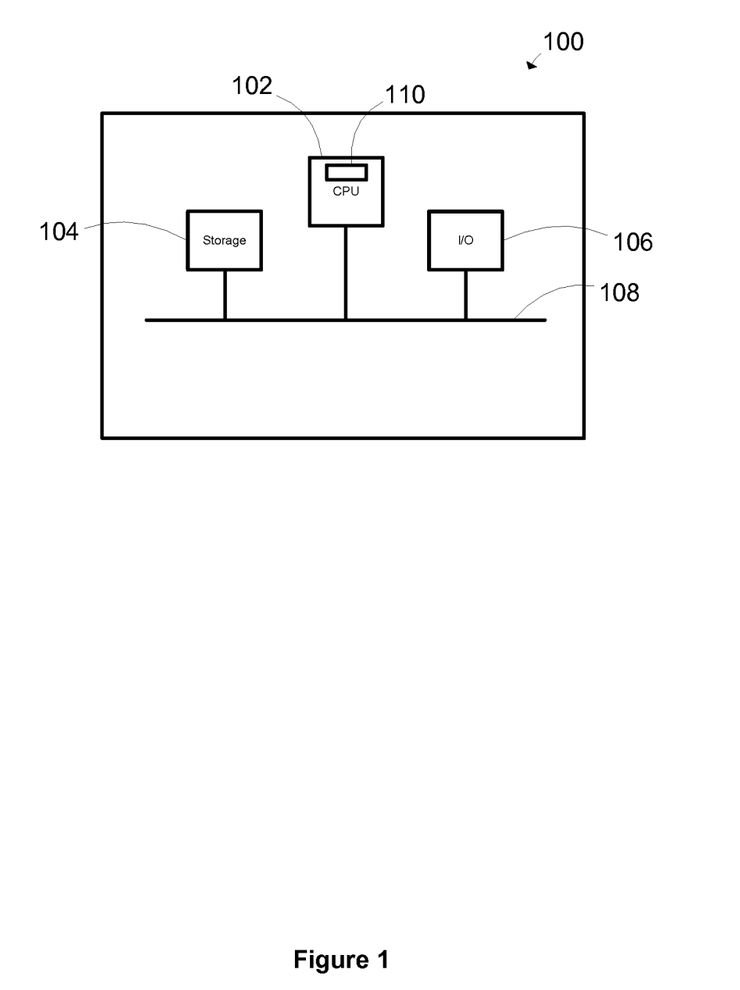
FIG. 1 is a schematic diagram illustrating a computing system of an embodiment of the present invention.

FIG. 1 is a block diagram of a computer system 100 suitable for the operation of embodiments of the present invention. A central processor unit (CPU) 102 is communicatively connected to storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
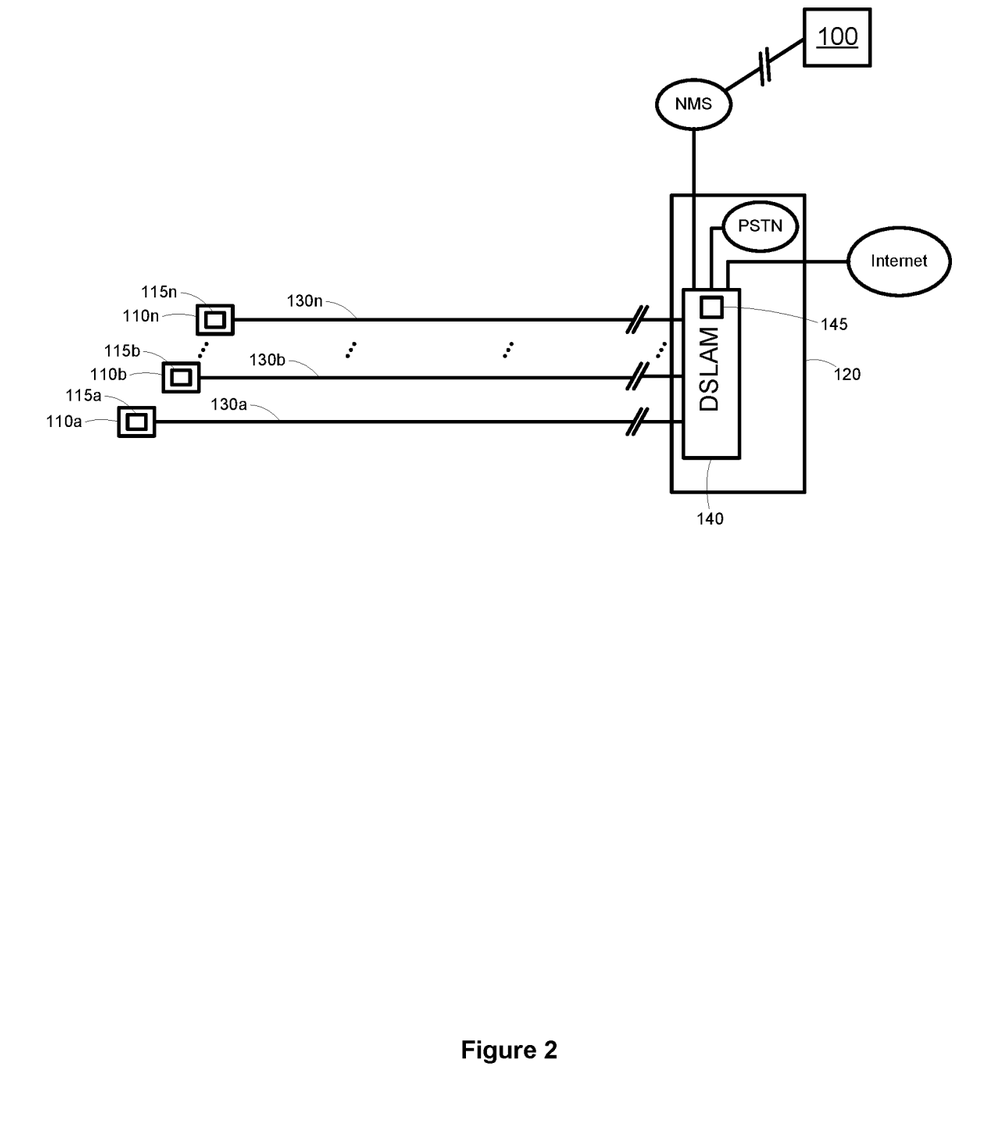
FIG. 2 is a schematic diagram illustrating the computing system of FIG. 1 in a multi-terminal telecommunications environment.

FIG. 2 illustrates the computer system 100 in a multi-terminal telecommunications environment 1 of an embodiment of the present invention. The telecommunications system 1 includes a plurality of Customer Premises Equipment (CPE) 110a . . . 110n connected to an exchange 120, each via a copper pair 130a . . . 130n. The copper pair may use any one of the family of xDSL protocols, such as ADSL, VDSL, VDSL2, G.fast, etc, and may also pass through a further DSL element such as a street cabinet and/or distribution point. Furthermore, the connection between the CPEs and the exchange may be carried in part or in full by an optical fibre connection. To cover all scenarios, the term "line" will hereinafter be used to describe any suitable connection between the CPEs 110a . . . 110n and the exchange 120. In the exchange, the lines 130a . . . 130n terminate at an aggregation transceiver device, in this example a Digital Subscriber Line Access Multiplier (DSLAM) 140, which is configured to provide Internet and telephony services to each CPE via each copper pair. The DSLAM thus provides onward connections to the Internet, to a PSTN, and to a Network Management System (NMS).

The CPEs 110a . . . 110n and DSLAM 140 all include a control unit 115a . . . 115n, 145, which are configured to measure certain properties of a modem located in the CPE or DSLAM, or the associated line, and store them in memory. In this embodiment, the control units 115a . . . 115n, 145 are configured to store DSL-related parameters such as Signal to Noise Ratio (SNR), SNR margin, error counts, retrain counts, etc., which are stored in 15-minute bins in the Management Information Base (MIB). In this embodiment, the control units 115a . . . 115n, 145 are also configured to store non-DSL-related parameters such as the line's resistance, moisture levels, etc., which are also stored in memory. Furthermore, each line 130a . . . 130n may include a further control unit (not shown), provided at any point along its length, which is also configured to perform measurements of the various DSL-related and non-DSL-related parameters noted above.

The various control units 115a . . . 115n, 145, 160a . . . 160n are all configured to report their stored DSL-related and non-DSL-related parameters to the NMS. In this embodiment, the NMS receives this data once per day and each day's data is stored, creating a timeline of operational data for subsequent analysis. The NMS typically analyses the DSL-related part of this data in order to optimise the multi-terminal telecommunications system via Dynamic Line Management (DLM) procedures.

In an embodiment of the present invention, the computer system 100 is configured to retrieve this data from the NMS and store it as a vector of quantities, hereinafter designated 'x'. The computer system 100 uses data x in an autonomic process to control the telecommunications system 1. A detailed example of one such autonomic process will now be described in detail. The skilled person will note, however, that the telecommunications system 1 is just one example of a multi-terminal computing system and the various aspects and embodiments of the invention described hereinafter are applicable to any multi-user computing system.

In the multi-terminal telecommunications system 1, a user of one CPE may terminate their service with the Network Operator. The user's line may remain inactive, or the user may be switched to a service provided by another Network Operator (where the telecommunications system is unbundled and services can be provided by several Network Operators along the same copper pair). In any case, the user may want to request that their service be provided again by the original Network Operator. As some time has passed since the original Network Operator served that user via that line, the Network Operator must decide whether to a) automatically restart the service without sending out an engineer, or b) send an engineer out to inspect the line and associated infrastructure and manually restart it. There is a greater chance of developing a fault with option a) over option b), and such a fault would have a negative impact on the customer experience. However, there is a greater financial cost associated with option b) over option a). Accordingly, the Network Operator must make a decision on which lines it would be beneficial to use option a) over option b).

In this embodiment, an algorithm is used to decide whether the Network Operator should automatically restart the service or send an engineer to manually restart it. This algorithm may take into account, for example, the amount of time that has passed since the Network Operator terminated service to that user, DSL fault statistics of neighbouring lines, and the various DSL-related and non-DSL-related data noted above. The algorithm thus takes the stored diagnostic data x as an input and outputs either option a) or option b).

The Network Operator may then act upon this output. With either option a) or option b), there are two possible outcomes. One option is a success, which in this example means that the service is successfully restarted without a fault occurring in the near future. The second option is a failure, in which the service does not successfully restart and enters a fault state either immediately or shortly after restarting. One characteristic of this system is that the probabilities of success and failure when choosing option a), i.e. to automatically restart the service rather than sending an engineer, are correlated with the data x. However, the probabilities of success and failure when choosing option b), i.e. to send an engineer to manually restart the line, are not correlated with the data x. The aim therefore is to optimise the algorithm as a function of x, which predicts how likely option a) is in succeeding and base the decision whether to opt for option a) or b) depending on policy criteria specifying what constitutes an acceptable proportion of failures.

The present invention relates to a computer system 100 implementing an autonomic process which, in this embodiment, is configured to manage the above algorithm. There are several methods adopted by the computer system 100 (which may be implemented in any combination or individually), which will now be explained. The first method relates to the process of modifying the algorithm within operator controlled operating limits.

Section 1: Modifying an Algorithm of an Autonomic Process

The autonomic process is configured to analyse stored diagnostic data x for the telecommunications system 1 (e.g. historical diagnostic data that has been collected at the NMS), and determine whether the current algorithm should be changed. An overview of the autonomic process will be described with reference to FIGS. 3 to 5.

In this embodiment, the autonomic process starts with an initial algorithm that has been manually created for deciding whether to automatically restart the service or send an engineer. The initial algorithm (hereinafter, "$V_0$") may be applied to the stored data x on the multi-terminal telecommunications system 1 and output a decision (option a) or option b)) for each line in the telecommunications system 1. In one example, the initial algorithm $V_0$ is based on the following:

1. Retrieve parameters V_AGEOFSTOP, V_DCVOLTAGEBE, V_DCVOTLAGEAB, V_CAPACITANCEBALANCE, V_U2DCPE, V1_DIS, V_NTSA, V_TOK−1, V_CAPACITANCEAB, V_DCCURRENTAB
2. Apply weightings to each parameter
3. Add each weighted parameter; and
4. If greater than a threshold, output decision a); if lower than a threshold, output decision b).

In the above algorithm, (in which the letters 'A' and '13' are each representative of one copper wire in a pair forming a DSL), V_AGEOFSTOP is a value of the time elapsed since the DSL has been served by the Network Operator, V_DCVOLTAGEBE is a value of the DC voltage between B and Earth, V_DCVOLTAGEAB is a value representing the voltage between A and B, V_CAPACITANCEBALANCE is a value of the capacitance ratio of A to Earth and B to Earth, V_U2DCPE is a derived value based on the presence of a terminal at the end of the DSL, V1_DIS is a derived value based on the insulation resistance between A and B, V_NTSA is a derived value based on the number of terminals at the end of the DSL, V_TOK−1 is a derived value based on the resistance and capacitance of A and B, V_CAPACITANCEAB is a value of the capacitance between A and B, and V_DCCURRENTAB is a value of the DC current between A and B.

In this embodiment, the autonomic process acting on the telecommunications system 1 adjusts the initial algorithm $V_0$ by the addition a rule. However, the skilled person will understand that the initial algorithm $V_0$ may be modified by the addition or removal of a rule (e.g. adding or removing a particular parameter) or by the variance of an existing rule (e.g. by changing a weighting attributed to one or more parameters or by varying a threshold). The autonomic process implemented by computer system 100 uses a machine learning process to change the algorithm $V_0$ from its initial state to a new state. This is achieved in the following manner.

As a first step (FIG. 3, step S1.1), the computing system 100 collects historical and current operational data x (i.e. DSL-related and non-DSL-related operational data) from the NMS via the I/O interface 106 for all lines in the telecommunications system 1. In this embodiment, the computing system 100 then develops the algorithm such that its initial state $V_0$ becomes the root node of a decision tree, and modifications to this initial state $V_0$ become branches from this root node. The algorithm is developed according to the following function:

$$V_i(x_L) = \begin{cases} F_i(x_L), V_{i-1}(x_L) = (a) \\ G_i(x_L), V_{i-1}(x_L) = (b) \end{cases}$$

Thus, at each process instance i, the computing system 100 evaluates two possible modifications to the algorithm, $F_i$ and $G_i$. These two modifications to the algorithm are generated by a machine learning process (explained below in section 1.3), and the modifications are added as branches to the decision tree if they pass the acceptance criteria. The algorithm may then be applied to any line in the telecommunications system 1, and the output of the final node in the decision tree is the algorithm output.

Figure 3:
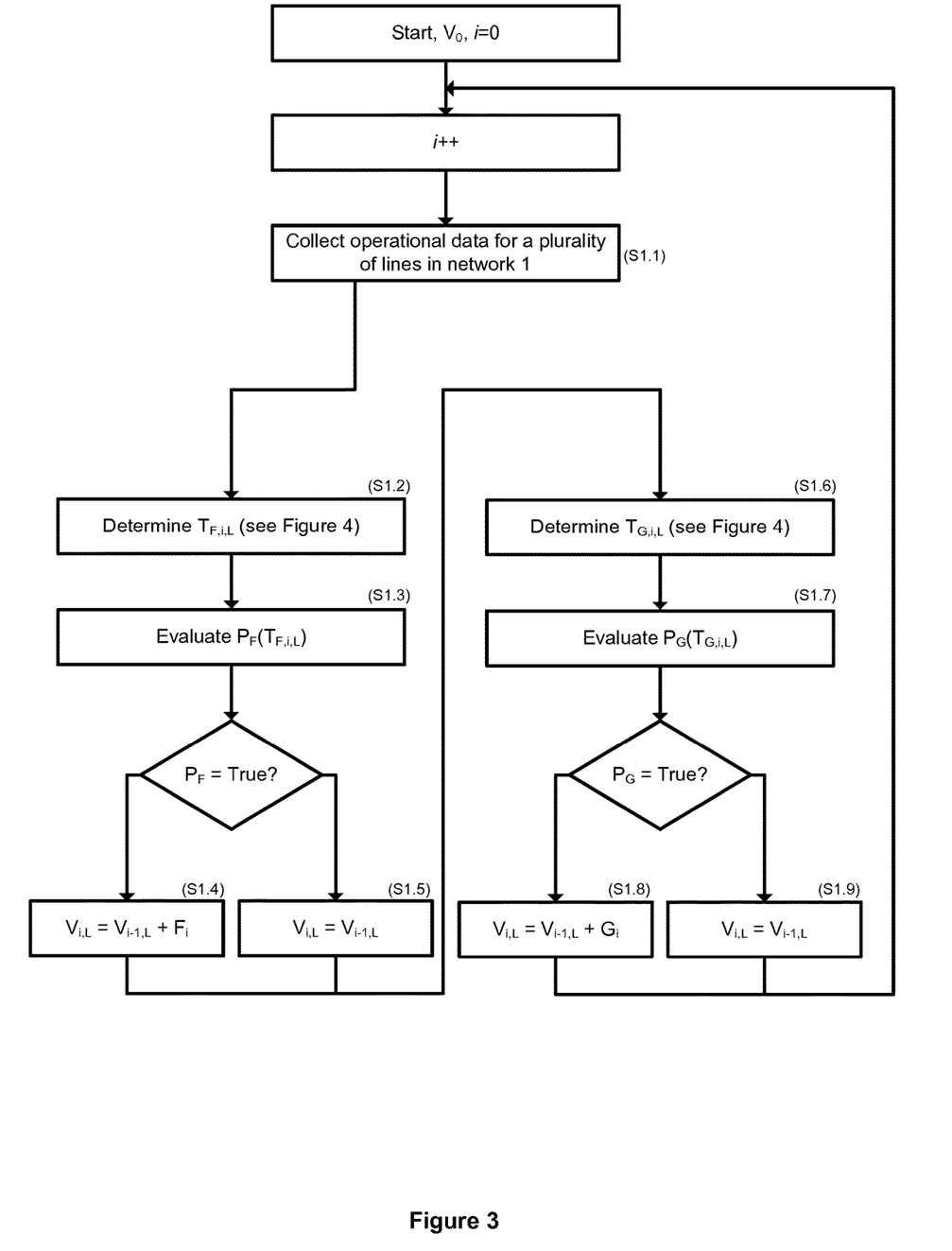
FIG. 3 is a flow diagram of a method implemented by the computing system of FIG. 1 in an embodiment of a method of the present invention.

Accordingly, following step S1.1, the computing system 100 evaluates a modification following an option a) assignment at the previous stage i−1. This will now be explained.

Section 1.1: Modification $F_i$, Following an Option a) Assignment

In step S1.2, a machine learning process operates on the stored diagnostic data, x, to produce a candidate modification to the algorithm for that line, designated $T_{F,i}$, (this process is described in section 1.3, below). This modification is then tested against the policy-based criteria $a_{t,F}$, $s_{t,F}$, according to the following functions:

$$F_i(x_L) \begin{cases} T_{F,i}(x_L), p_F(T_{F,i}) = \text{true} \\ 1, \text{else} \end{cases}$$

$$p_F(T_{F,i}) = \begin{cases} \text{true}, A_F(T_{F,i}) > a_{t,F} \text{ and } S_F(T_{F,i}) > s_{t,F} \\ \text{false, else} \end{cases}$$

Accordingly, the computing system 100 applies the algorithm including this candidate modification to the stored diagnostic data x in order to generate a set of predicted outcomes if option a) is chosen for all lines in the multi-terminal telecommunications system 1. These predictions may then be evaluated to determine the values of the following contingency matrix:

| Test $p_F$ | Actual Success | Actual Failure |
|---|---|---|
| Predict Success | $c_{11}$ | $c_{12}$ |
| Predict Failure | $c_{21}$ | $c_{22}$ |

These values are determined by analysing the historical diagnostic data and by using known characteristics of this data. That is, if a particular line is predicted a success using the algorithm with the candidate modification (which was the same result as in the previous stage i−1 of the algorithm), then the historical diagnostic data may be analysed to determine if that line was successfully restarted or whether it failed following an automatic restart in order to determine values $c_{11}$ or $c_{12}$ respectively. If the particular line is predicted to fail using the algorithm with the candidate modification, then the values of $c_{21}$ and $c_{22}$ may be estimated since these values do not depend on the diagnostic data x (i.e. a particular percentage of these lines are either successes or failures regardless of their conditions as defined in the diagnostic data).

The computing system 100 may then define values $A_F$ and $S_F$:

$$A_F = \frac{c_{22}}{c_{21} + c_{22}}$$

$$S_F = \frac{c_{21} + c_{22}}{c_{11} + c_{12} + c_{21} + c_{22}}$$

In this embodiment, the first performance criterion, $A_F$, quantifies how accurately the algorithm including the candidate modification can predict failures, whilst the second performance criterion, $S_F$, is a proportion of instances in the historical diagnostic data that are predicted to generate failures. These performance criteria aim to find a subset of lines having a current prediction of option a) which should be reclassified as option b) with a suitably high accuracy.

Once the computing system 100 has determined the values for $A_F$ and $S_F$, it may then evaluate $p_F(T_{F,i})$ (step S1.3). If $p_F(T_{F,i})$ is true (i.e. $A_F$ and $S_F$ satisfy the Network Operator defined performance thresholds) then the candidate modification to the algorithm is accepted (step S1.4). Conversely, if $p_F(T_{F,i})$ is false (i.e. $A_F$ and $S_F$ do not satisfy the Network Operator defined performance thresholds), then the candidate modification is rejected (step S1.5).

To summarise, a candidate algorithm modification $T_{F,i}$ is generated based on a subset of the historical data. A set of predicted outcomes for a plurality of lines is then generated based on another subset of the historical data. If these predictions satisfy certain accuracy and sensitivity performance criteria, then the algorithm including the candidate modification is accepted. The algorithm is thus modified to introduce a new branch to the decision tree, in which the new leaf node is the algorithm including the modification. If the algorithm including the candidate modification does not satisfy the accuracy and sensitivity criteria, then the candidate modification is rejected. The algorithm is thus modified to introduce a new branch to the decision tree, in which the new leaf node is the unmodified algorithm (i.e. the same as the previous algorithm).

Once the modification has been applied or rejected, the computing system 100 then evaluates a modification following an option b) assignment at the previous stage i−1. This will now be explained.

Section 1.2: Modification $G_i$, Following an Option b) Assignment

Following the determination of one branch node in steps S1.4 and S1.5, the computing system then determines whether a modification according to function $G_i$ (see step S1.6). Before going into detail, a brief background on how the data is generated for this determination will be explained.

In section 1.1, it was possible to evaluate the performance of a candidate modification to the algorithm for lines in which the previous state of the algorithm output option a), as the stored historical data may be analysed to determine whether these instances were successes or failures following the automatic restart of the line. However, if the decision from the previous state of the algorithm was option b), then when the operator acted upon this decision resulting in an engineer being sent out and the line manually restarted. In this case, it is not possible to determine what would have happened if option a) had been decided instead. This section details the process when the previous state of the algorithm for a particular line returns option b).

At each process instance, the decision at following an evaluation of $V_i$ may be either option a) or option b). A proportion of the lines which have decision of option b) are entered into a 'trial', in which they may be reclassified as option a) depending on the analysis described below. In doing so, the computing system 100 generates a source of enriched data for later analysis. The selection of lines put forward for a trial may be based on a random selection, or may be geographically or temporally based. Thus, for a line which at stage i−1 was assigned option b), and that line has been allocated to the trial, then option a) is taken instead and the process loops back round to step s1.1. For these lines (hereinafter known as 'trial lines'), the lines are automatically restarted and the success or failure of this event is recorded. Accordingly, this data may be used in the following iteration of the process.

Returning to the method as shown in FIG. 3, the computing system then uses a machine learning process on the stored diagnostic data, x, to produce a candidate modification to the algorithm, $T_{G,i}$ (as explained in section 1.3), which is then evaluated according to the following functions:

$$G_i(x_L) \begin{cases} T_{G,i}(x_L), & p_G(T_{G,i}) = \text{true} \\ 2, & \text{else} \end{cases}$$

$$p_G(T_{G,i}) = \begin{cases} \text{true}, & A_G(T_{G,i}) > a_{t,G} \text{ and } S_G(T_{G,i}) > s_{t,G} \\ \text{false, else} \end{cases}$$

As the trial lines were previously re-assigned as option a) and were automatically restarted, it is now possible to evaluate, based on this historical operational data, whether the algorithm including the candidate modification would be successful or a failure based on this data. Accordingly, the computing system 100 applies the algorithm including the candidate modification to the subset of historical data relating to the lines participating in the trial to produce the following values:

| Test $p_F$ | Actual Success | Actual Failure |
|---|---|---|
| Predict Success | $d_{11}$ | $d_{12}$ |
| Predict Failure | $d_{21}$ | $d_{22}$ |

Thus, by forcing a reassignment of these trial lines into the trial, we are able to evaluate performance criteria for lines which would otherwise be impossible. The performance criteria are defined as:

$$A_G = \frac{d_{11}}{d_{11} + d_{12}}$$

$$S_G = \frac{d_{11} + d_{12}}{d_{11} + d_{12} + d_{21} + d_{22}}$$

In this embodiment, the first performance criterion, $A_G$, quantifies how accurately the algorithm including the candidate modification can predict successes, whilst the second performance criterion, $S_G$, is a proportion of instances in the historical diagnostic data that are predicted to succeed. These performance criteria therefore aim to find a subset of lines within the trial having a current prediction of option b) which should be reclassified as option a) with a suitably high accuracy. The computing system 100 may therefore evaluate $p_G(T_{G,i})$ in step S1.7, and, if the performance criteria meet the thresholds, then the candidate modification is accepted. If so, then a second branch is added in the decision tree, stemming from the node representing the previous algorithm, and the new leaf node represents the algorithm including the modification (step S1.8). If not, then the candidate modification is rejected, in which (in step S1.9) the case a second branch is added in the decision tree, stemming from the node representing the previous algorithm, and the new leaf node represents the unmodified algorithm (i.e. the same as the previous algorithm).

Once the modifications $F_i$ and $G_i$ have been applied or rejected, then algorithm $V_i$ can be applied to all lines and a decision of option a) or option b) can be determined. The Network Operator may then act upon this determination.

The above processes detailed in sections 1.1 and 1.2 are performed at stage i. The new algorithm at stage i is stored in memory, and the process loops back and repeats at a later time.

Section 1.3: Generating the Candidate Algorithms

As noted above, the candidate modifications to the algorithms (either $F_{i,L}$ or $G_{i,L}$, depending on the decision at the previous stage of the process) are generated using a machine learning process. This may be via any classification model that is compatible with the structure of the data vector, x. The modelling methodology used in the present embodiment is based on a classification tree algorithm, H (sometimes known as a decision tree). The particular classification tree algorithm may be, for example, those used in "Classification and regression trees", Breiman, L., Friedman, J., Olshen, R, Stone, C. (1984); "Data mining with decision trees: theory and applications", "Rokach, L., Maimon, O. (2008); or "Induction of Decision Trees. Machine Learning 1"; Quinlan, J. (1986).

One of the inputs to the classification tree algorithm H when generating a candidate modification to the autonomic process algorithm is known as a 'penalty matrix', z, such that H(z). The penalty matrix of this embodiment of the invention is based on the following table:

| Penalty Matrix | Actual Success | Actual Failure |
| --- | --- | --- |
| Predict Success | 0 | 1 |
| Predict Failure | z | 0 |

The penalty matrix assigns penalties to misclassifications (i.e. misclassifying whether a DSL may be successfully automatically restarted or not). The penalties for correctly predicting either a success or a failure are therefore 0, and the relative penalties of misclassifying a line as a success or a failure are designated 1 or z respectively. It is the ratio of these two misclassifications that is important, so only a single adjustable parameter z is necessary. Accordingly, if z is increased, misclassification of failures count more strongly than misclassifications of successes in the classification tree algorithm when generating candidate modifications, $T_{F,i}$, $T_{G,i}$. This encourages a tendency towards generating modifications which classify fewer lines as failures, but with a higher prediction accuracy. Conversely, if z is decreased, the classification tree algorithm generates candidate modifications, $T_{F,i}$, $T_{G,i}$, which encourage more failure predictions but with a lower accuracy.

In this embodiment of the invention, the computing system 100 implements an iterative process in order to determine a value for z (that is, the input into the classification tree algorithm to generate the new candidate modification, $T_{F,i}$, $T_{G,i}$) which provides a suitable compromise between the two performance criteria. Thus, for each instance of $F_i$ or $G_i$ above (i.e. when generating a new candidate modification for each algorithm for each line at instance i), the computing system 100 searches for a suitable value of z by evaluating:

$$z_{k+1} = z_k - g_a(A_{F,G} - a_{t,F,G}) + g_s(S_{F,G} - s_{t,F,G})$$

This iterative process will now be explained with reference to FIGS. 4 and 5. In step S2.1 of a first iteration of the process, the value of a ratio of the two 'gearing' parameters ($g_s/g_a$) in the above parameters is set to, for example, 0.03 (the determination of a suitable ratio of these gearing parameters is explained below). According to the above equation, these gearing parameters determine how much the penalty parameter z should be changed in successive iterations of the process when the actual values for $A_{F,G}$ and $S_{F,G}$ differ from performance criteria thresholds. Furthermore, in step S2.2, the value for $z_k$ is set to 0 for the first iteration of k.

Figure 4:
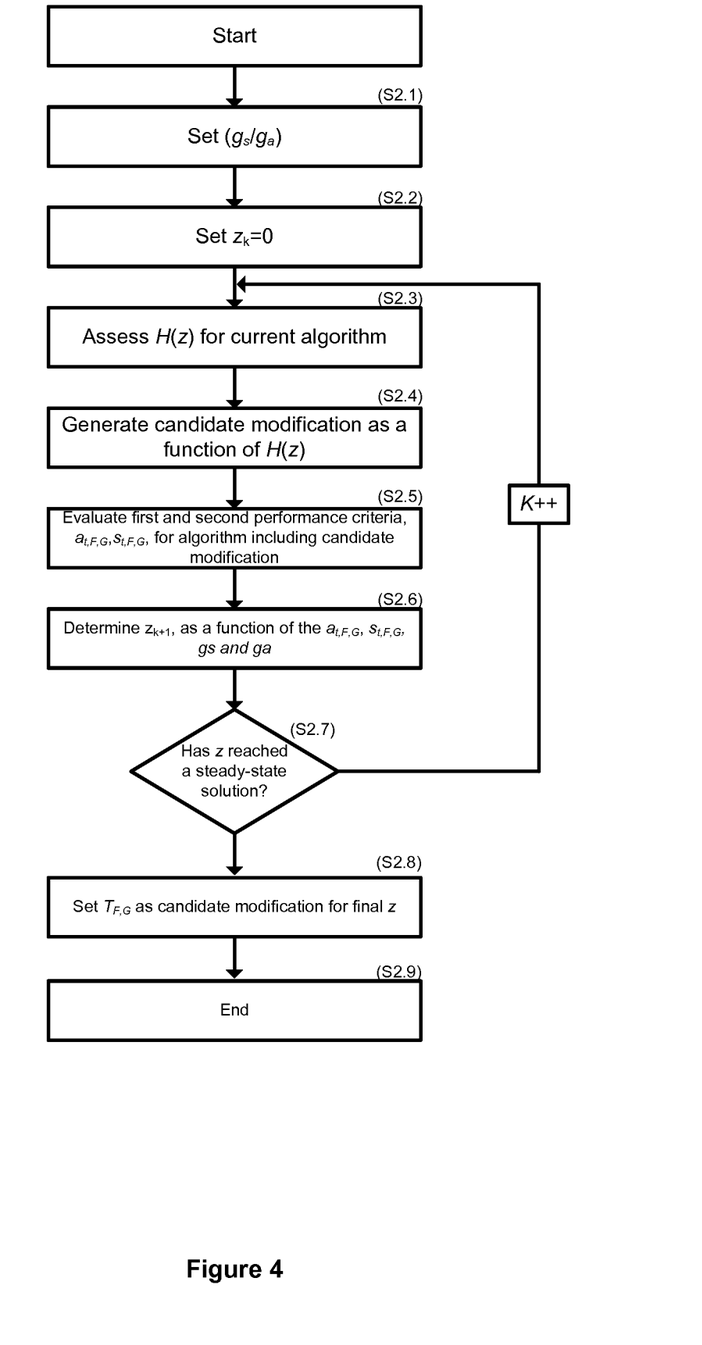
FIG. 4 is a flow diagram illustrating a step of the flow diagram of FIG. 3.
Figure 5:
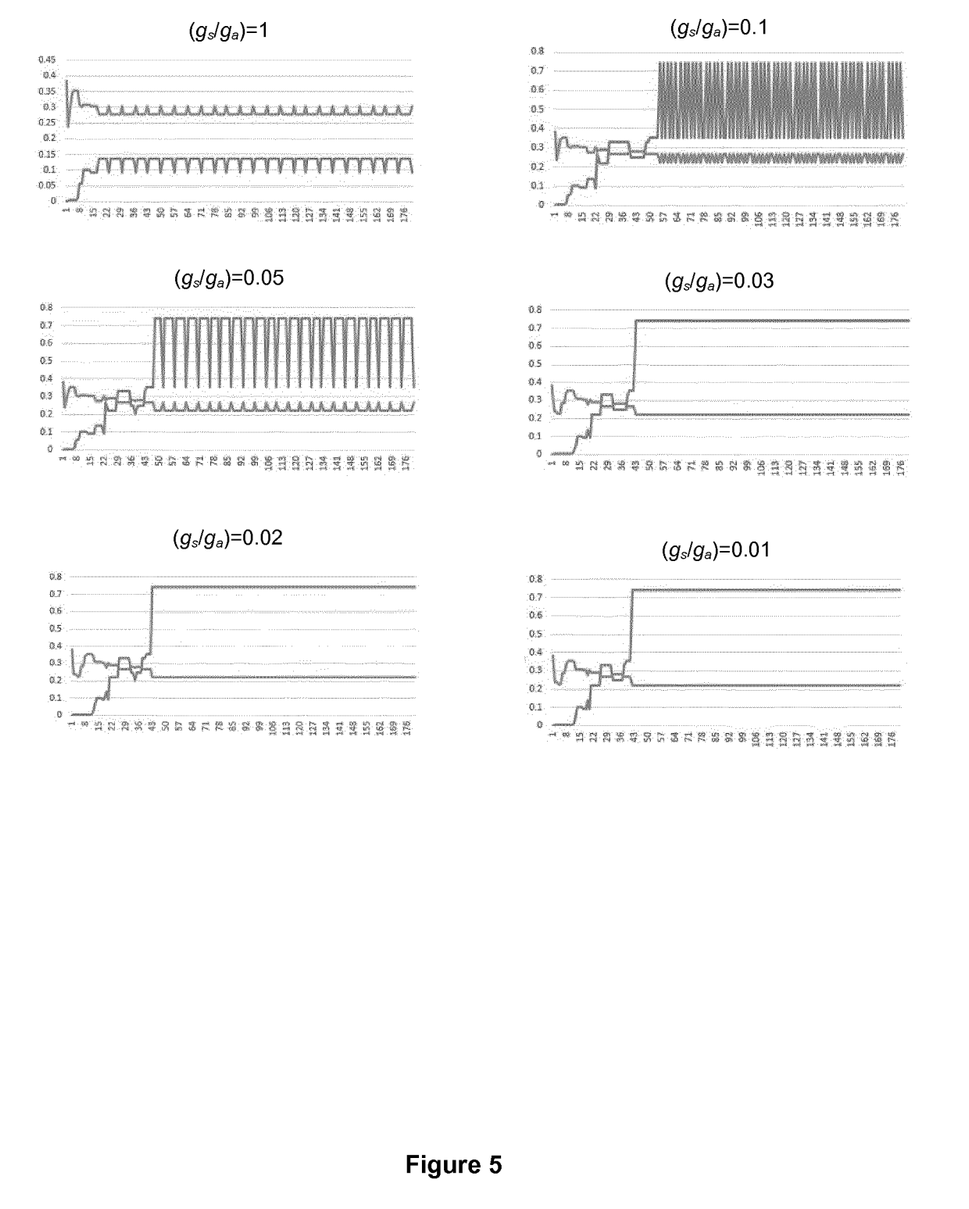
FIG. 5 includes several graphs representing data of an example of FIG. 4.

As shown in FIG. 4, in each iteration of k, the computing system 100 assesses $H(z_k)$ for the current algorithm (section 2.3), and generates a candidate modification to the algorithm based on $H(z_k)$ (step S2.4). The computing system 100 then generates a set of predicted outcomes by applying the algorithm including the candidate modification to a subset of diagnostic data, x, (step S2.5), and determines values for the first and second performance criteria for the current candidate modification (step S2.6). The differences between these two values for the performance criteria and the operator's thresholds $a_{t,F,G}$, $S_{t,F,G}$, multiplied by their respective gearing parameters $g_a$ and $g_s$, determine the new value for $z_{k+1}$ according to the above equation (step S2.6). In step S2.7, the computing system 100 determines whether the process has reached a steady-state solution (e.g. by determining whether $z_{k+1}$ is substantially equal to $z_k$). If not, then the process loops back to step S2.3 and the computing system 100 repeats the above process using a new value for $z_k$.

The gearing parameters therefore determine how much the penalty parameter z should be changed in each iteration of k when the actual values for $A_{F,G}$ and $S_{F,G}$ differ from performance thresholds. Thus, if $A_{F,G} < a_{t,F,G}$ then the term $g_a(A_{F,G} - a_{t,F,G})$ in the above equation will increase the penalty for misclassifying failures, which in the next iteration of k should increase $A_{F,G}$. Similarly, if $S_{F,G} < s_{t,F,G}$, then the term $g_s(S_{F,G} - s_{t,F,G})$ in the above equation will increase the number of lines predicted to fail, which in the next iteration of k should increase $S_{F,G}$.

Thus, after several iterations, the computing system 100 arrives at a steady-state solution in which $z_{k+1}$ is equal to or substantially equal to $z_k$. The skilled person may determine this point to be when $z_{k+1}$ is within a predetermined threshold of $z_k$ for a predetermined number of iterations (the threshold and iterations may be varied upon application). In another arrangement, the computing system 100 may implement a sliding window of a predetermined number of $z_k$ values, and then determine that it has arrived at a steady-state solution based on a statistical analysis of these sliding window values. The size of the sliding window will vary on application, but should include a significant number of iterations and encompass any natural oscillations in the value of $z_k$.

The statistical analysis of the sliding window values may be based on one or more of the following:
- a peak to peak maximum (i.e. minimum distance of $z_k$),
- the standard deviation of $z_k$, and/or
- the average deviation defined as the absolute value of the individual values of $z_k$ (i.e. the mean of $z_k$ over the sliding window).

The convergence criteria may be that whichever of these parameters is chosen should be no greater than either:
- a set percentage of the mean of $z_k$ over the sliding window, or
- a fixed set predefined number.

Once the computing system 100 has determined that it has arrived at the steady-state solution, the following equation applies:

$$\frac{A_{F,G} - a_{F,G}}{S_{F,G} - s_{F,G}} = \frac{g_s}{g_a}$$

The modification to the algorithm generated once the value for z had reached such a steady-state becomes the candidate modification, $T_{F,G}$, in step S2.8 to be evaluated as described in sections 1.1 and 1.2 above.

As noted above, the ratio of the gearing parameters $g_s/g_a$ is important as it determines how much the penalty parameter z should be changed in each iteration of k when the actual values for $A_{F,G}$ and $S_{F,G}$, differ from performance thresholds. In an enhancement to the above method, the computing system 100 determines what gearing ratio to use. Accordingly, in an initial tuning process (which doesn't result in a new candidate modification to the algorithm but is merely designed to find a suitable gearing parameter), the above process is repeated for a plurality of different ratios of gearing parameters, of $g_s/g_a$=0.01, 0.02, 0.03, 0.05, 0.1 and 1. The values of $A_{F,G}-a_{F,G}$ and $S_{F,G}-s_{F,G}$ at each instance of k for the above ratios are shown in the various graphs of FIG. 5. As is clear, when the ratio of gearing parameters is too high, at 0.05, 0.1 or 1, the iterative process cannot find a steady state solution as the values rise and fall sharply across several iterations. However, for several other ratios of gearing parameters, namely 0.03, 0.02 and 0.01, the iterative process finds a steady state solution.

In this embodiment, the computing system 100 selects the greatest gearing ratio which returns a steady-state solution (e.g. 0.03) as the gearing ratio to use when generating candidate modifications to the algorithm. Thus, after this initial tuning process, the gearing ratio has been selected and candidate modifications may be generated and evaluated in each iteration of i.

This initial tuning process ensures that machine learning process is able to arrive at a candidate modification within a suitable time period (i.e. within a suitable number of iterations of k).

In a further enhancement, the gearing ratio may be re-determined periodically using the same process but on more recent operational data. This ensures that the gearing ratio is appropriate to the current operating environment. However, this is non-essential. It is still possible, although not optimal, for the computing system 100 to generate candidate modifications based on a gearing ratio which does not find a steady-state solution.

The above processes set a framework for adapting an algorithm of an autonomic process having certain performance criteria. This framework ensures that any modifications to the algorithm are within the limits imposed by the performance criteria thresholds. The skilled person will also understand that the above method may be "retrofitted" to current non-learning algorithms, such that a machine learning process is applied and the algorithm is improved within certain performance criteria.

Section 1.4: Intelligent Selection of Trial Lines

In section 1.2 of the above embodiment, it was described how a subset of "trial" lines which have been assigned option b) by the algorithm are re-classified as option a). Once this is implemented, the data will thereafter show whether the line was successfully restarted or not. This enriched data enables the system to evaluate the prediction success rate for an algorithm with a candidate modification in which an asset is reassigned from option b) to option a).

In the above embodiment, the lines were selected for the trial either by random selection or on a geographical or temporal factor. An enhancement to this concept will now be described.

We again start with the initial manually determined algorithm $V_0$. In a first timestep, the algorithm $V_0$ is evaluated to assign either option a) or option b) to each line. In this example, a subset of the option b) assignments are reassigned to option a). In this first timestep, this subset of lines to be re-classified is chosen randomly. The algorithm following this first timestep, $V_1$, remains the same as $V_0$.

In the second timestep, the system 100 collects operational data for a plurality of lines in the network 1. In the previous embodiment, it was described how the system 100 generated and evaluated candidate modifications to the algorithm based on operator defined accuracy and sensitivity thresholds at each timestep based on the collected operational data. In this enhanced embodiment, the system develops algorithm $V_1$ into two separate algorithms, $V_{2.1}$, $V_{2.2}$ (in which the first integer denotes the timestep of the algorithm's evolution, and the second integer denotes the algorithm). The first algorithm, $V_{2.1}$, is developed in the same manner as that of the previous embodiment (as described in sections 1.1 to 1.3) and is therefore developed according to operator defined performance criteria and the outputs of the first algorithm are applied to each line at each timestep. The second algorithm, $V_{2.2}$, uses different performance criteria and is used to identify suitable lines to be used as "trial lines" to create the enriched data for the evaluation of $G_{i+1}$ in the first algorithm (i.e. the evaluation of function G in the first algorithm for the next timestep).

In this second timestep, the first algorithm, $V_{2.1}$, is therefore developed by evaluating $F_2$ and $G_2$ as described in sections 1.1 to 1.3 above, wherein $G_2$ is based on the data collected for the randomly selected trial lines in the first timestep. In this embodiment, the second algorithm, $V_{2.2}$, is developed in the same manner as the first, although different accuracy thresholds are used. This method will now be described in more detail, and it will be shown how this technique selects more suitable lines to use in the trial.

The first step of this method is the collection of operational data, which includes data for the lines which were previously randomly selected for the trial in the first timestep. This is the same data that is used in the evaluation of the first algorithm, $V_{2.1}$, above, although in practice the order of these two algorithms does not matter. The second algorithm, $V_{2.2}$, is then developed according to the following function:

$$V_{3.2}(x_L) = \begin{cases} F_{3.2}(x_L), V_{2.2}(x_L) = (a) \\ G_{3.2}(x_L), V_{2.2}(x_L) = (b) \end{cases}$$

Wherein, $$F_{3.2}(x_L) = \begin{cases} T_{F,3.2}(x_L), p_F(T_{F,3.2}) = \text{true} \\ 1, \text{else} \end{cases}$$

$$G_{3.2}(x_L) = \begin{cases} T_{G,3.2}(x_L), p_G(T_{G,3.2}) = \text{true} \\ 2, \text{else} \end{cases}$$

And, $$p_{F,G}(T_{F,G,3.2}) = \begin{cases} \text{true}, A_{F,G}(T_{F,G,3.2}) > a_{t,F,G} \text{ and } S_G(T_{F,G,3.2}) > s_{t,F,G} \\ \text{false, else} \end{cases}$$

Thus, the first and second algorithms are developed according to the same function. However, the second algorithm uses higher accuracy thresholds, $a_{t,F,G}$, than the first algorithm. All other operator-defined variables may be the same as used in the development of the first algorithm. In doing so, the second algorithm identifies a number of lines which it predicts, with a high accuracy, are going to fail if reclassified from option b) to option a). This method follows section 1.2 above, in which a candidate modification $G_{3.2}$ is derived using the relatively high accuracy threshold. The computing system 100 then applies the second algorithm to the collected data for each line in order to predict whether each line will either succeed or fail if reclassified as option a). As the accuracy threshold is set relatively high for the second algorithm, only a relatively small number of lines are identified as being highly likely to fail if reclassified. Thus, following this step, the lines are divided into 1) those which are highly likely to fail and 2) those which have not been identified as highly like to fail.

In this embodiment, the system 100 does not select any lines from those which have been identified as highly likely to fail if reclassified as a trial line.

At the end of the second timestep, the first and second algorithms, $V_{2.1}$, $V_{2.2}$, have been developed such that new nodes are added to the classification trees (wherein the new nodes may or may not include the candidate modifications depending on whether they meet the performance criteria). The first algorithm is applied to each line in the network 1 and a set of option a) or option b) outputs are determined. The second algorithm is applied to each line in the network 1 to identify those lines determined to be option b) by the first algorithm that should be reclassified as option a).

The benefit of selecting a subset of lines to be reclassified at each iteration of the algorithm is that performance criteria for an algorithm being developed by a machine learning process can always be evaluated from the historical data. This is not always possible for data sets collected for certain systems, such as the one described in the embodiments above in which it is possible to evaluate the performance for a modification to the algorithm for a line which was previously classified as option a)—as the line is automatically restarted and it can be seen whether it succeeds or fails—but it is not possible to evaluate the performance for a modification to the algorithm for a line which was previously classified as option b)—as an engineer is sent out to manually restart the line and it is not known what would have happened if the line was automatically restarted. The enhancement to this method detailed in the present section of this specification is advantageous as it utilises the same data and algorithm development process to identify cases which should be used in the trial as they will lead to a greater chance of leading to a modification to the first algorithm in subsequent timesteps. This will now be explained.

In the third timestep, the system 100 collects new operational data for the plurality of lines in the network 1. This data therefore includes operational data following the application of option a) or option b) decisions at the end of the second timestep described above (including those reclassified from option b) to option a) by the second algorithm). The first and second algorithms are then developed in the same manner. Accordingly, function $V_{3.1}$ is evaluated in order to determine whether candidate modifications $F_{3.1}$ and $G_{3.1}$ should be accepted. As discussed in section 1.2 above, the candidate modification $G_{3.1}$ is generated using a machine learning process, and is then applied to a subset of the historical data to produce the following sets of values:

| Test $p_F$ | Actual Success | Actual Failure |
|---|---|---|
| Predict Success | $d_{11}$ | $d_{12}$ |
| Predict Failure | $d_{21}$ | $d_{22}$ |

As the lines selected for the trial in the second timestep were more likely to result in a success than a purely random selection (as those which were highly likely to fail were excluded from the selection process) then any new modifications to the first algorithm (created by the machine-learning process) are more likely to correctly predict whether those marginal cases should be classified as first actions or second actions. Furthermore, by excluding the cases in which it is highly likely that a re-classification would result in a failure, the negative impact on customer experience is reduced.

The first algorithm continues to be developed in the same way in the third timestep. Furthermore, in this embodiment, the second algorithm is also being developed by selecting a second subset of trial lines (i.e. distinct from the set selected as trial lines in the second timestep) to further enrich the data set for the purpose of developing the second algorithm. This is achieved by generating a candidate modification $G_{3.2}$ to the second algorithm and applying it to a subset of historical data to determine if each line would be successful or a failure if reclassified as option a). As noted above in the description for the second timestep, a first subset of trial lines is selected out of those which do not have a high likelihood of failure if reclassified as option a). However, in order to develop the second algorithm, a second subset of trial lines is selected out of those which do have a high likelihood of failure if reclassified as option a). In doing so, the data collected in subsequent timesteps (subsequent to these actions being taken on the second subset of trial lines) may be used to develop the second algorithm by the machine learning process (described in section 1.3). The extra data may, for example, lead to a modification of the second algorithm such that a line previously classified as highly likely to fail if reclassified as option a) may instead be classified as not highly likely to fail if reclassified as option a), and may therefore be a candidate trial line for first subset of trial lines in subsequent timesteps.

Accordingly, at the end of the third timestep, the first algorithm is evaluated against each line in the network 1 to determine whether option a) or option b) should be applied, and a first and second subset of the option b) assignments are reclassified as option a) according to the second algorithm.

In the above embodiment, the accuracy threshold used by the second algorithm is greater than that used in the first algorithm. The value used is may be determined by the network operator based on the following considerations:
- if set too high, a relatively small number of lines will be excluded from the trial selection and the chances of improving the first algorithm is only increased by a relatively small amount;
- if set too low, a relatively large number of lines will be excluded from the trial which will reduce the number of failures. However, it is less likely for lines to be reclassified as option a) when they would actually have restarted without failure, and so the interesting cases which could lead to a modification to the first algorithm are not readily identified.

The above enhancement to the embodiment of the invention therefore describes a method of identifying suitable option b) cases to be reclassified as option a). However, it is not essential for these cases to be identified using a parallel operation of the same algorithm with different accuracy thresholds. An alternative example will now be described.

Figure 6:
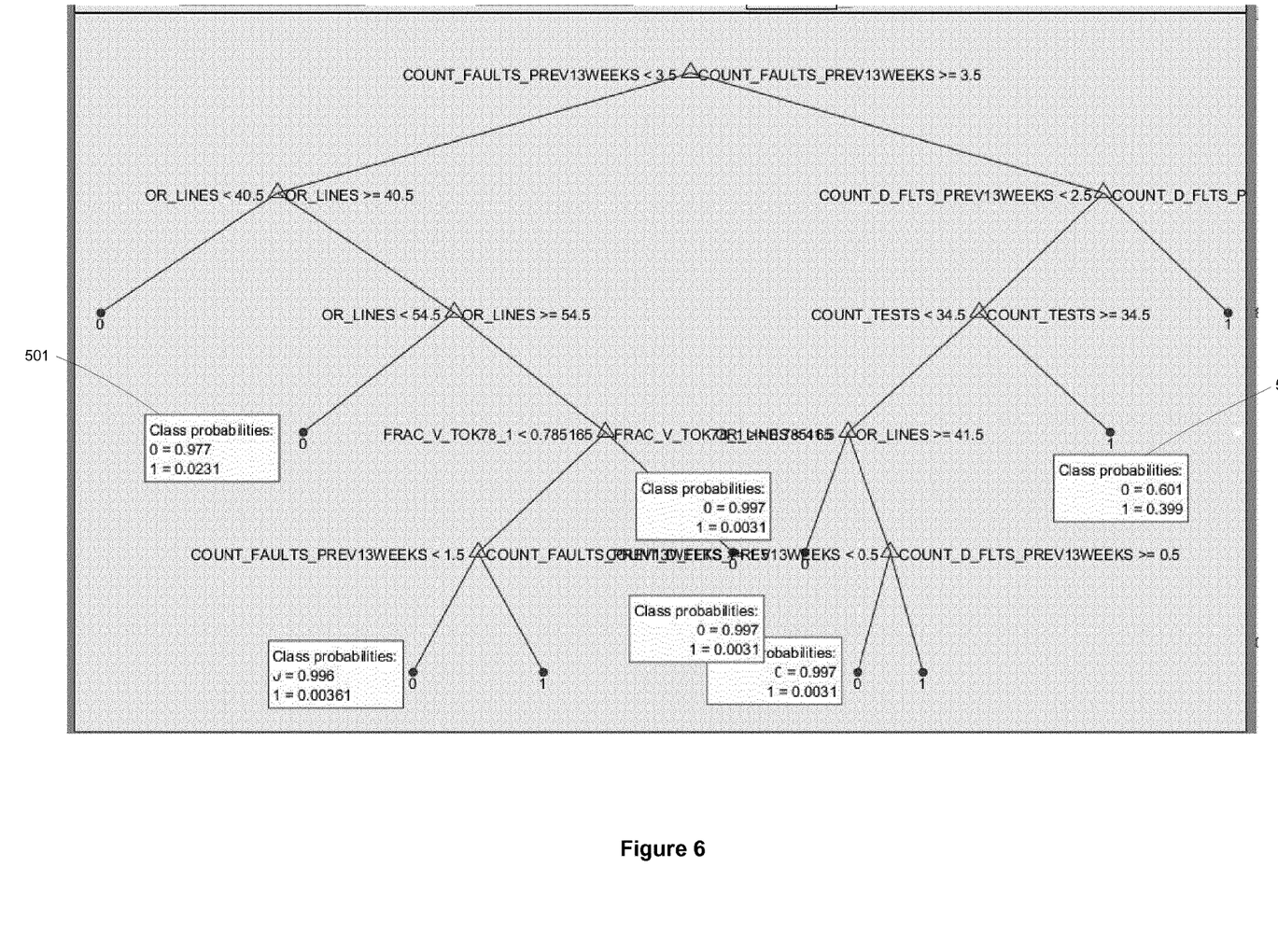
FIG. 6 is an example of a classification tree used in an embodiment of a method of the present invention.

In this alternative example, the algorithm is again a nested classification tree but with a binary logistic regression technique used to assign success/failure probability ratings to each leaf node. A suitable classification tree for this example may be based on "Classification and regression trees", Breiman, Leo; Friedman, J. H.; Olshen, R. A.; Stone, C. J. (1984), and suitable binary regression trees for this example may be based on "The regression analysis of binary sequences (with discussion)", D. C. Montgomery, E. A. Peck and G. G Vining, "Introduction to Linear Regression" Cox DR, J Roy Stat Soc B (1958): 215-242, or "Regression Modelling Strategies", Harrell, Frank E. (2001). This is shown in the example of FIG. 6, in which "Class 0" is a predicted success and "Class 1" is a predicted failure. Accordingly, the data for each line may be used to follow the classification tree from the root to its destination leaf node, and the line will then be assigned a probability of success and probability of failure if that line is reclassified from option b) to option a) based on its leaf node. For example, if a line is classified into a leaf node identified as 501 in FIG. 6, then the probability of failure is 2.31%, whereas if a line is classified into a leaf node identified as 502 in FIG. 6, then the probability of failure is 39.9%.

Using this approach, the network operator may select which lines should be re-classified as option a) by:
1. selecting lines which have a failure probability less than a predetermined threshold. For example, if a line's data is such that it falls into a leaf node having a, say, less than 35% chance of failure, then it may be selected as a trial line; or
2. preferentially selecting lines which have a lower failure probability (e.g. by using weightings that are correlated to the failure probabilities).

The above embodiments are applied to a particular algorithm operating on a multi-terminal computing system. However, the skilled person will understand that the algorithm may apply to other forms of computing systems. For example, a data centre may comprise a number of resources which are either operational or dormant. The data centre operator may then decide on whether to automatically deploy the dormant resource to a user, or whether to manually review and configure the resource for deployment. Data may be collected for the data centre (covering, for example, the length of time since the resource was last used and/or operational data) and an algorithm may be used to make the above decision, which may also be developed using a machine learning process. This algorithm may therefore benefit from the advantages of the present invention, in which a resource which has been designated for manual configuration may be entered into a trial and automatically deployed. This creates enriched data for the machine learning process in the next iteration.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. An autonomic method for controlling an algorithm on a multi-terminal computing system, wherein the algorithm is configured to analyse diagnostic data for each terminal and an outcome of the analysis is a first action or a second action, the method comprising the steps of:
receiving a first set of data for the multi-terminal computing system;
applying the algorithm to the first set of data to classify each terminal in the multi-terminal computing system as being associated with either the first action or second action;
prior to applying the first action and second action respectively to each terminal in the multi-terminal computing system, re-classifying a first subset of terminals classified as being associated with the first action as being associated with the second action; and
applying the first action to each terminal in the multi-terminal computing system classified as being associated with the first action, except the first subset of terminals, and applying the second action to the first subset of terminals and to each terminal in the multi-terminal computing system classified as being associated with the second action;

wherein the step of re-classifying the first subset of terminals classified as being associated with the first action as being associated with the second action includes:
  i) predicting a likelihood of success value for each terminal classified as being associated with the first action if re-classified as being associated with the second action; and
  ii) selecting the first subset of terminals to re-classify as being associated with the second action based on their predicted likelihood of success values.

2. The method as claimed in claim 1, wherein the step of predicting the likelihood of success value for each terminal classified as being associated with the first action if re-classified as being associated with the second action includes:
  i.i) identifying a first group of terminals classified as being associated with the first action that have a likelihood of success value if re-classified as being associated with the second action above a predetermined accuracy threshold;
  i.ii) identifying a second group of terminals classified as being associated with the first action that have a likelihood of success value if re-classified as being associated with the second action below the predetermined accuracy threshold; and
  i.iii) assigning a first likelihood of success value to each terminal in the first group of terminals and a second likelihood of success value to each terminal in the second group of terminals.

3. The method as claimed in claim 2, wherein the first subset of terminals are selected from the first group of terminals.

4. The method as claimed in claim 2, further comprising the step of:
  re-classifying a second subset of terminals classified as being associated with the first action as being associated with the second action, wherein the second subset of terminals are selected from the second group of terminals.

5. The method as claimed in claim 1, wherein the multi-terminal computing system has the property that a performance criterion of a success prediction of the algorithm is not derivable for each terminal having the first action applied thereto.

6. The method as claimed in claim 5, wherein the multi-terminal computing system has the property that a performance criterion of a success prediction of the algorithm is not derivable for each terminal having the second action applied thereto, and the method further comprises the steps of:
  re-classifying a another subset of terminals classified as being associated with the second action as being associated with the first action; and
  applying the first action to the another subset of terminals and to each terminal in the multi-terminal computing system classified as being associated with the first action, except the first subset of terminals, and applying the second action to the first subset of terminals and to each terminal in the multi-terminal computing system classified as being associated with the second action, except the another subset of terminals.

7. The method as claimed in claim 1, wherein the first action includes an automatic restart of a service and the second action includes a manual restart of the service.

8. A computer program product stored on a non-transitory computer readable medium and comprising instructions which, when the program is executed by a computer, cause the computer to carry out the method of claim 1.

9. A non-transitory computer-readable data carrier having stored thereon a computer program which upon execution by a computer perform an autonomic method for controlling an algorithm on a multi-terminal computing system, wherein the algorithm is configured to analyse diagnostic data for each terminal and an outcome of the analysis is a first action or a second action, the method comprising:
  receiving a first set of data for the multi-terminal computing system;
  applying the algorithm to the first set of data to classify each terminal in the multi-terminal computing system as being associated with either the first action or second action;
  prior to applying the first action and second action respectively to each terminal in the multi-terminal computing system, re-classifying a first subset of terminals classified as being associated with the first action as being associated with the second action;
  applying the first action to each terminal in the multi-terminal computing system classified as being associated with the first action, except the first subset of terminals; and
  applying the second action to the first subset of terminals and to each terminal in the multi-terminal computing system classified as being associated with the second action;
  wherein the re-classifying of the first subset of terminals classified as being associated with the first action as being associated with the second action includes:
    i) predicting a likelihood of success value for each terminal classified as being associated with the first action if re-classified as being associated with the second action; and
    ii) selecting the first subset of terminals to re-classify as being associated with the second action based on their predicted likelihood of success values.

10. A computing apparatus for controlling an algorithm on a multi-terminal computing system, wherein the algorithm is configured to analyse diagnostic data for each terminal and an outcome of the analysis is a first action or a second action, the computing apparatus comprising:
  an input/output interface for receiving diagnostic data relating to a multi-user computing system, and
  a processor configured to
    receive a first set of data for the multi-terminal computing system;
    apply the algorithm to the first set of data to classify each terminal in the multi-terminal computing system as being associated with either the first action or second action;
    prior to applying the first action and second action respectively to each terminal in the multi-terminal computing system, re-classify a first subset of terminals classified as being associated with the first action as being associated with the second action;
    apply the first action to each terminal in the multi-terminal computing system classified as being associated with the first action, except the first subset of terminals; and apply the second action to the first subset of terminals and to each terminal in the multi-terminal computing system classified as being associated with the second action;

wherein to re-classify the first subset of terminals classified as being associated with the first action as being associated with the second action, the processor is further configured to:
 i) predict a likelihood of success value for each terminal classified as being associated with the first action if re-classified as being associated with the second action; and
 ii) select the first subset of terminals to re-classify as being associated with the second action based on their predicted likelihood of success values.

11. The computing apparatus as claimed in claim 10, wherein to predict the likelihood of success value for each terminal classified as being associated with the first action if re-classified as being associated with the second action, the processor is further configured to:
 i.i) identify a first group of terminals classified as being associated with the first action that have a likelihood of success value if re-classified as being associated with the second action above a predetermined accuracy threshold;
 i.ii) identify a second group of terminals classified as being associated with the first action that have a likelihood of success value if re-classified as being associated with the second action below the predetermined accuracy threshold; and
 i.iii) assign a first likelihood of success value to each terminal in the first group of terminals and a second likelihood of success value to each terminal in the second group of terminals.

12. The computing apparatus as claimed in claim 11, wherein the first subset of terminals are selected from the first group of terminals.

13. The computing apparatus as claimed in claim 11, wherein the processor is further configured to:
 re-classify a second subset of terminals classified as being associated with the first action as being associated with the second action, and the second subset of terminals are selected from the second group of terminals.

14. The computing apparatus as claimed in claim 10, wherein the multi-terminal computing system has the property that a performance criterion of a success prediction of the algorithm is not derivable for each terminal having the first action applied thereto.

15. The computing apparatus as claimed in claim 14, wherein the multi-terminal computing system has the property that a performance criterion of a success prediction of the algorithm is not derivable for each terminal having the second action applied thereto, and the processor is further configured to:
 re-classify another subset of terminals classified as being associated with the second action as being associated with the first action; and
 apply the first action to the another subset of terminals and to each terminal in the multi-terminal computing system classified as being associated with the first action, except the first subset of terminals, and apply the second action to the first subset of terminals and to each terminal in the multi-terminal computing system classified as being associated with the second action, except the another subset of terminals.

16. The computing apparatus as claimed in claim 10, wherein the first action includes an automatic restart of a service and the second action includes a manual restart of the service.

* * * * *